United States Patent
Zhu et al.

(10) Patent No.: US 11,518,432 B2
(45) Date of Patent: Dec. 6, 2022

(54) ZERO POINT COMPENSATION METHOD AND DEVICE FOR ELECTRIC POWER STEERING

(71) Applicant: Beijing IDRIVERPLUS Information Technology Co., Ltd., Beijing (CN)

(72) Inventors: Shibin Zhu, Beijing (CN); Bo Yan, Beijing (CN); Cheng Xu, Beijing (CN); Fang Zhang, Beijing (CN); Xiaofei Li, Beijing (CN); Dezhao Zhang, Beijing (CN); Xiao Wang, Beijing (CN); Shuhao Huo, Beijing (CN)

(73) Assignee: Beijing IDRIVERPLUS Information Technology Co., Ltd., Beijing (CN)

( * ) Notice: Subject to any disclaimer, the term of this patent is extended or adjusted under 35 U.S.C. 154(b) by 128 days.

(21) Appl. No.: 17/218,194

(22) Filed: Mar. 31, 2021

(65) Prior Publication Data

US 2021/0316780 A1 Oct. 14, 2021

(30) Foreign Application Priority Data

Apr. 10, 2020 (CN) .......................... 202010280321.7

(51) Int. Cl.
- B62D 6/00 (2006.01)
- B62D 5/04 (2006.01)

(52) U.S. Cl.
CPC ......... B62D 5/0457 (2013.01); B62D 5/0481 (2013.01); B62D 6/00 (2013.01)

(58) Field of Classification Search
CPC ...................................................... B62D 6/00
See application file for complete search history.

(56) References Cited

U.S. PATENT DOCUMENTS

| 9,731,755 | B1 * | 8/2017 | Moshchuk | ............... B62D 6/00 |
| 9,758,191 | B2 * | 9/2017 | Kim | ..................... B62D 15/021 |
| 10,063,178 | B2 | 8/2018 | Lee | |
| 2010/0145579 | A1 | 6/2010 | O'Brien | |

FOREIGN PATENT DOCUMENTS

| CN | 105984490 A | 10/2016 |
| CN | 107697155 A | 2/2018 |
| DE | 102008021862 A1 | 11/2009 |
| JP | 2010264833 A | 11/2010 |

\* cited by examiner

*Primary Examiner* — Jacob D Knutson
*Assistant Examiner* — Hosam Shabara

(57) ABSTRACT

Disclosed is zero point compensation method and device for EPS. The method includes: acquiring a value of lateral distance when a vehicle travels along an ideal path and obtaining a smoothed lateral distance value, for each control cycle; calculating a longitudinal movement distance value of the vehicle for each control cycle; performing linear fitting to obtain a linear relationship between the longitudinal movement distance value and the smoothed lateral distance value; calculating a zero point compensation angle for the EPS based on a first parameter in the linear relationship and a preset steering wheel transmission ratio, and compensating a steering control angle; and determining that the zero point compensation angle passes verification when a minimum residual error is less than a preset acceptable deviation. In this way, the time required for calibration can be reduced, and the accuracy and effectiveness of the control algorithm can be improved.

11 Claims, 4 Drawing Sheets

ZERO POINT COMPENSATION METHOD AND DEVICE FOR ELECTRIC POWER STEERING

CROSS-REFERENCE TO RELATED PATENT APPLICATION

The present disclosure claims the benefit of and priority to Chinese Patent Application No. 202010280321.7 filed on Apr. 10, 2020, the entire disclosure of which is incorporated by reference herein.

TECHNICAL FIELD

The present disclosure relates to the field of data processing, and in particular to a zero point compensation method and device for electric power steering (EPS).

BACKGROUND

With the rapid development of unmanned driving technology in recent years, unmanned driving algorithms have made great progress both in terms of level and effectiveness. In the development of lateral control algorithms, if the vehicle-related parameter calibration methods are complex or inaccurate, the accuracy and adaptability of the designed control algorithm will be compromised. Thus, the calibration of vehicle lateral control parameters is of great significance to the success and rationality of the control algorithm design.

In the prior art, after the lateral control algorithm design for an autonomous vehicle is completed, the algorithm designer adds a zero point compensation value for the EPS in the calculation of a lateral angle based on the deviation shown in the unmanned driving of the vehicle and his own experience. However, there also exist the following disadvantages in adding the zero point compensation value for the EPS to the lateral angle:
  (1) since the zero point compensation value for the EPS is entirely based on the experience of the personnel, its accuracy needs to be investigated;
  (2) since the algorithm personnel is involved in the whole process, a lot of manpower is required to be consumed for the vehicle mass production; and
  (3) no intelligence is embodied in the control algorithm.

SUMMARY

An object of embodiments of the present disclosure is to provide a zero point compensation method and device for EPS, so as to solve the problems in the prior art that the accuracy needs to be investigated, the required manpower consumption is large, and no intelligence is embodied in the control algorithm.

In order to solve the problems, in a first aspect, the present disclosure provides a zero point compensation method for EPS, which includes:
  acquiring a value of lateral distance between a midpoint of a vehicle and an ideal path for each control cycle when the vehicle travels along the ideal path;
  smoothing the values of lateral distance for a plurality of control cycles to obtain a smoothed lateral distance value for each of the plurality of control cycles;
  calculating a longitudinal movement distance value of the vehicle for each control cycle, based on a constant speed at which the vehicle travels and the number of elapsed control cycles;
  performing linear fitting based on the smoothed lateral distance value and the longitudinal movement distance value for each control cycle to obtain a linear relationship between the longitudinal movement distance value and the smoothed lateral distance value;
  calculating a zero point compensation angle for the EPS, based on a first parameter in the linear relationship and a preset steering wheel transmission ratio;
  compensating a steering control angle based on the zero point compensation angle calculated for the EPS to obtain a compensated steering control angle;
  calculating a minimum residual error, based on path points on a preset automatic driving verification path and path points on an actual driving path as obtained under the steering control using the compensated steering control angle when the vehicle is traveling; and
  determining that the zero point compensation angle calculated for the EPS passes verification when the minimum residual error is less than a preset acceptable deviation.

In a possible implementation, acquiring the value of lateral distance for each control cycle when the vehicle travels along the ideal path further includes:
  determining a first path point and a second path point according to the midpoint of the vehicle and the ideal path, where the first path point and the second path point are path points on the ideal path that are closest to the midpoint; and
  obtaining a lateral deviation value by dividing a product of a first direction vector and a second direction vector by a distance between the first path point and the second path point, where the first direction vector is a direction vector between the midpoint and the first path point, and the second direction vector is a direction vector between the midpoint and the second path point.

In a possible implementation, smoothing the values of lateral distance for the plurality of control cycles to obtain the smoothed lateral distance value for each of the plurality of control cycles further includes:
  performing a moving-average smoothing process on the values of lateral distance according to a preset smoothing window to obtain the smoothed lateral distance value for each control cycle.

In a possible implementation, calculating the longitudinal movement distance value of the vehicle for each control cycle, based on the constant speed at which the vehicle travels and the number of elapsed control cycles further includes:
  multiplying the constant speed, at which the vehicle travels, by a sampling interval and the number of elapsed control cycles to obtain the longitudinal movement distance value of the vehicle for each control cycle.

In a possible implementation, performing the linear fitting based on the smoothed lateral distance value and the longitudinal movement distance value for each control cycle to obtain the linear relationship between the longitudinal movement distance value and the smoothed lateral distance value further includes:
  performing the linear fitting through a least squares method or a point-slope form by taking the longitudinal movement distance value for each control cycle as x-coordinates and taking the smoothed lateral distance value for each control cycle as y-coordinates to obtain the linear relationship between the longitudinal movement distance value and the smoothed lateral distance value, where the linear relationship is represented by the first parameter and a second parameter.

In a possible implementation, calculating the zero point compensation angle for the EPS based on the first parameter in the linear relationship and the preset steering wheel transmission ratio further includes:

multiplying arctangent of the first parameter by the steering wheel transmission ratio to obtain the zero point compensation angle for the EPS.

In a possible implementation, calculating the minimum residual error, based on path points on the preset automatic driving verification path and path points on the actual driving path as obtained under the steering control using the compensated steering control angle when the vehicle is traveling further includes:

calculating the minimum residual error according to $$\varepsilon_N = \sum_0^M \{(p(i)-x(i))^2 \div (n(i)-y(i))^2\},$$

wherein p(i) refers to an x-coordinate of a path point corresponding to the $i^{th}$ control cycle on the actual driving path; n(i) refers to a y-coordinate of a path point corresponding to the $i^{th}$ control cycle on the actual driving path; x(i) refers to an x-coordinate of the path point corresponding to the $i^{th}$ control cycle on the preset automatic driving verification path; y(i) refers to a y-coordinate of the path point corresponding to the $i^{th}$ control cycle on the preset automatic driving verification path; $\varepsilon_N$ refers to the minimum residual error; i refers to the index of a control cycle; and M refers to the total number of control cycles required for completing the preset automatic driving verification path.

In a possible implementation, the zero point compensation method further includes:

generating a flag bit identifying that the zero point compensation angle calculated for the EPS passes the verification; and writing the zero point compensation angle calculated for the EPS into a calibration file.

In a second aspect, the present disclosure provides a zero point compensation device for EPS, which includes:

an acquisition unit configured to acquire a value of lateral distance between a midpoint of a vehicle and an ideal path for each control cycle when the vehicle travels along the ideal path;

a processing unit configured to smooth the values of lateral distance for a plurality of control cycles to obtain a smoothed lateral distance value for each of the plurality of control cycles;

a calculation unit configured to calculate a longitudinal movement distance value of the vehicle for each control cycle, based on a constant speed at which the vehicle travels and the number of elapsed control cycles;

a fitting unit configured to perform linear fitting based on the smoothed lateral distance value and the longitudinal movement distance value for each control cycle to obtain a linear relationship between the longitudinal movement distance value and the smoothed lateral distance value, where the calculation unit is further configured to calculate a zero point compensation angle for the EPS based on a first parameter in the linear relationship and a preset steering wheel transmission ratio;

a compensation unit configured to compensate a steering control angle based on the zero point compensation angle calculated for the EPS to obtain a compensated steering control angle, where the calculation unit is further configured to calculate a minimum residual error, based on path points on a preset automatic driving verification path and path points on an actual driving path as obtained under the steering control using the compensated steering control angle when the vehicle is traveling; and a determination unit configured to determine that the zero point compensation angle calculated for the EPS passes verification when the minimum residual error is less than a preset acceptable deviation.

In a possible implementation, the zero point compensation device further includes:

a generation unit configured to generate a flag bit identifying that the zero point compensation angle calculated for the EPS passes the verification; and a writing unit configured to write the zero point compensation angle calculated for the EPS into a calibration file.

In a third aspect, the present disclosure provides an apparatus, which includes a memory and a processor, where the memory is configured to have programs stored therein, and the processor is configured to implement the method according to any one of the first aspect.

In a fourth aspect, the present disclosure provides a computer program product including instructions which, when run on a computer, cause the computer to implement the method according to any one of the first aspect.

In a fifth aspect, the present disclosure provides a computer-readable storage medium for storing computer programs, where the computer programs are executed by a processor to implement the method according to any one of the first aspect.

By applying the zero point compensation method and device for the EPS provided in the embodiments of the present disclosure, the zero point compensation angles for the EPS can be calibrated for different vehicles, which can reduce the investment in personnel and time. In addition, the steering control angle of the vehicle can be compensated with the zero point compensation angle, which can improve the effectiveness of the control algorithm. Moreover, this feedforward method can compensate the steering control angle in advance and thus is superior to the feedback method in terms of time.

DETAILED DESCRIPTION

Figure 1:
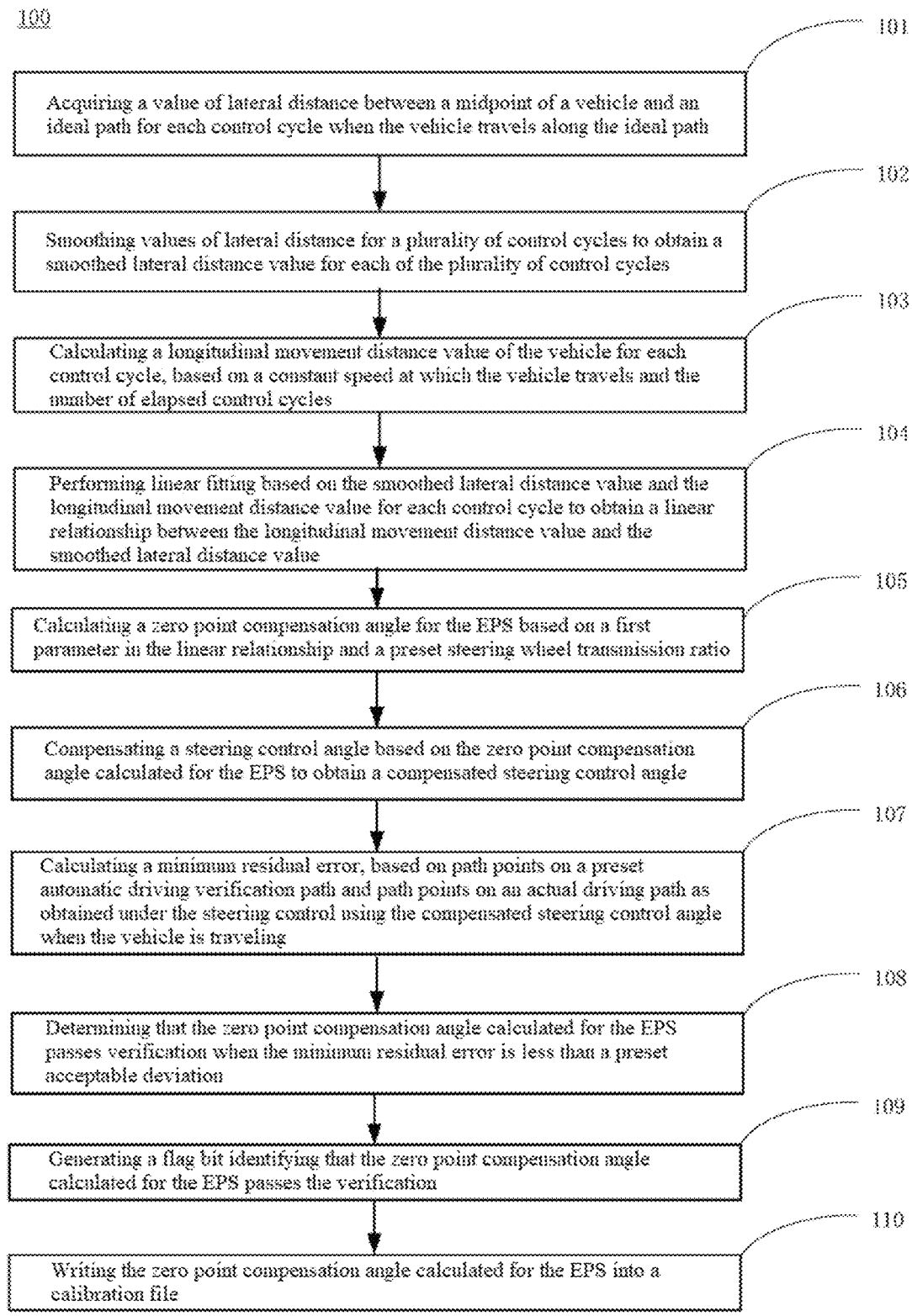
FIG. 1 is a schematic flowchart of a zero point compensation method for the EPS provided by a first embodiment of the present disclosure.

The present disclosure will be further described in detail below with reference to the accompanying drawings and embodiments. It shall be understood that the specific embodiments described herein are only intended to explain the present disclosure, but not to limit the disclosure. In addition, it should be noted that, for the convenience of description, only the parts related to the present disclosure are shown in the drawings.

It should be noted that the embodiments of the present disclosure and the respective features of the embodiments may be combined with each other in any manner with no conflict. The present disclosure will be described in detail below with reference to the accompanying drawings and embodiments.

FIG. 1 is a schematic flowchart of a zero point compensation method for the EPS provided by a first embodiment of the present disclosure. The execution subject of the present disclosure is a terminal, server or processor with computing functions. The present disclosure takes the application of this method to unmanned vehicles as an example for description. When this method is applied to an unmanned vehicle, the execution subject of the method is an automated vehicle control unit (AVCU), which is namely a central processing unit of the unmanned vehicle and equivalent to the "brain" of the unmanned vehicle. As shown in FIG. 1, the present disclosure includes following steps.

In step 101, a value of lateral distance between a midpoint of a vehicle and an ideal path is acquired for each control cycle when the vehicle travels along the ideal path.

For the vehicle whose zero point compensation angle for the EPS is to be calibrated, the automatic driving data of the vehicle for a certain distance along the ideal path may be recorded. The automatic driving data includes upper layer-planned path information and positioning information. The planned path information includes a plurality of path points on the ideal path of the vehicle, and each path point includes a speed and a direction. The positioning information may include real-time vehicle position information of the vehicle. The value of lateral distance of the vehicle for each control cycle may be calculated in real time based on the plurality of path points on the ideal path and the real-time positions of the vehicle, which may be specifically performed by:

determining a first path point and a second path point according to the midpoint of the vehicle and the ideal path, where the first path point and the second path point are path points on the ideal path that are closest to the midpoint; and obtaining a value of lateral distance by dividing a product of a first direction vector and a second direction vector by a distance between the first path point and the second path point, where the first direction vector is a direction vector between the midpoint and the first path point, and the second direction vector is a direction vector between the midpoint and the second path point.

In an example, assuming that the position of the midpoint of the vehicle is 0, the position of the first path point on the ideal path is A, and the position of the second path point is B, the value of lateral distance may be calculated as follows:

$$d = \frac{\overrightarrow{OA} \times \overrightarrow{OB}}{|AB|} (|AB| > 0).$$

As an example, a step of determining whether the vehicle meets the calibration condition is further included before the step 101, and the step 101 is only performed if the vehicle meets the calibration condition.

If the calibration condition is met, it means that the vehicle is driving along a straight road in the automatic driving mode and the upper layers such as a sensing module, a positioning module, and a path planning module are all normal. The criterion of normality may be that the initialization state is normal and each module is in a non-faulty state. In the case of a faulty state, the AVCU may receive fault information sent by the corresponding module.

In step 102, values of lateral distance for a plurality of control cycles are smoothed to obtain a smoothed lateral distance value for each of the plurality of control cycles.

Specifically, for each control cycle, the value of lateral distance may fluctuate due to other objective conditions. Thus, a moving-average smoothing process may be performed on the values of lateral distance according to a preset smoothing window to obtain the smoothed lateral distance value for each control cycle. The specific formula is as follows:

$$d_s(i) = \frac{1}{2N+1}(d(i+N) + d(i+N-1) + \ldots + d(i-N))$$

$$d_s(1) = d(1)$$

$$d_s(2) = (d(1) + d(2) + d(3))/3$$

$$d_s(3) = (d(1) + d(2) + d(3) + d(4) + d(5))/5$$

$$\ldots,$$

where N refers to the length of a defined smoothing window, and the value of N includes but is not limited to 5 and 7. Exemplarily but not limitedly, taking N=5 as an example, when calculating the smoothed lateral distance value for the first control cycle, only one value of lateral distance is used; when calculating the smoothed lateral distance value for the second control cycle, respective values of lateral distance for the second control cycle as well as the previous one and the next one are averaged by dividing by 3, whereby the smoothed lateral distance value for the second control cycle can be obtained; when calculating the smoothed lateral distance value for the third control cycle, respective values of lateral distance for the third control cycle as well as the previous two and the next two are taken to thereby exactly constitute a window of 5 values and then averaged; and when calculating the smoothed lateral distance value of the fourth control cycle, respective values of lateral distance for the fourth control cycle as well as the previous two and the next two are taken to constitute a window of 5 values and then averaged, and so forth. As to the smoothed lateral distance values for the last two control cycles, they are processed in a similar manner as that of the smoothed lateral distance values for the first and second control cycles. Assuming that there is a total of n smoothed lateral distance values for n control cycles, the specific calculation process is as follows:

$$d_s(1) = d(1)$$

$$d_s(2) = (d(1) + d(2) + d(3))/3$$

$$d_s(3) = (d(1) + d(2) + d(3) + d(4) + d(5))/5$$

$$d_s(4) = (d(2) + d(3) + d(4) + d(5) + d(6))/5$$

-continued

...

$$d_s(n-2) = (d(n-4) + d(n-3) + d(n-2) + d(n-1) + d(n))/5$$

$$d_s(n-1) = (d(n-2) + d(n-7) + d(n))/3$$

$$d_s(n) = d(n)$$

As a result, the smoothed lateral distance value for each control cycle is obtained. The control cycle may be understood in such a way that the control cycle i may be related to the sampling frequency at which the vehicle control unit performs operation processing. When the sampling frequency is 20 Hz, i=1 means 0.05 s has been elapsed, and i=2 means 0.1 s has been elapsed.

In step 103, a longitudinal movement distance value of the vehicle is calculated for each control cycle based on a constant speed at which the vehicle travels and the number of elapsed control cycles.

Specifically, the prerequisite for calibration is to assume that the vehicle is driving at a constant speed. Therefore, the longitudinal movement distance value of the vehicle for current control cycle may be obtained by multiplying the constant speed, at which the vehicle travels, by the number of elapsed control cycles. The longitudinal movement distance value for each control cycle may be calculated specifically according to following formula:

$$X=v*t,$$

where X refers to the longitudinal movement distance value, v refers to the constant speed of the vehicle, and t refers to the time, t=i*0.05.

Taking 1 m/s as an example, when l=1, the longitudinal movement distance value is 0.05 m, and when l=2, the longitudinal movement distance value is 0.1 m, and so on . . . , so that the longitudinal movement distance value corresponding to each control cycle can be calculated.

In step 104, linear fitting is performed based on the smoothed lateral distance value and the longitudinal movement distance value for each control cycle to obtain a linear relationship between the longitudinal movement distance value and the smoothed lateral distance value.

Figure 2:
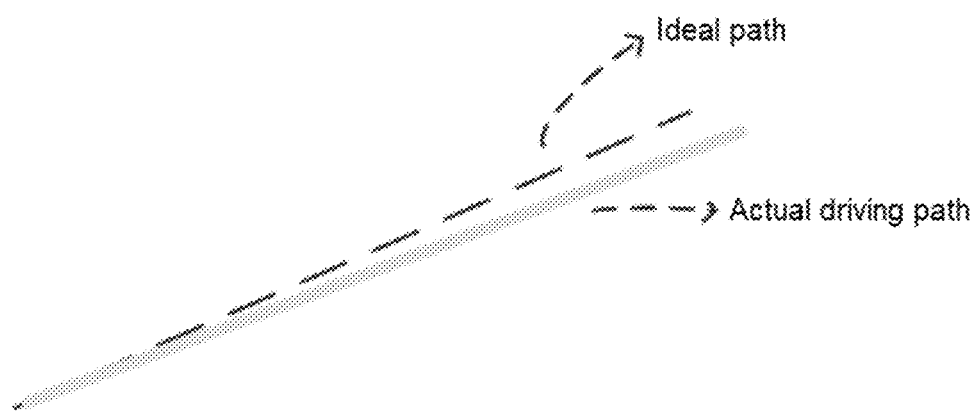
FIG. 2 is a schematic diagram of an actual driving path and an ideal path provided by a first embodiment of the present disclosure.

Specifically, referring to FIG. 2, the vehicle may go straight in an ideal state. However, due to the incorrect zero point for the EPS, the actual path of the vehicle may deviate from the ideal path. The linear fitting is performed through a least squares method or a point-slope form by taking the longitudinal movement distance value for each control cycle as x-coordinates and taking the smoothed lateral distance value of corresponding control cycle as y-coordinates to obtain the linear relationship between the longitudinal movement distance value and the smoothed lateral distance value. The linear relationship may be represented by the first parameter and a second parameter.

Figure 3:
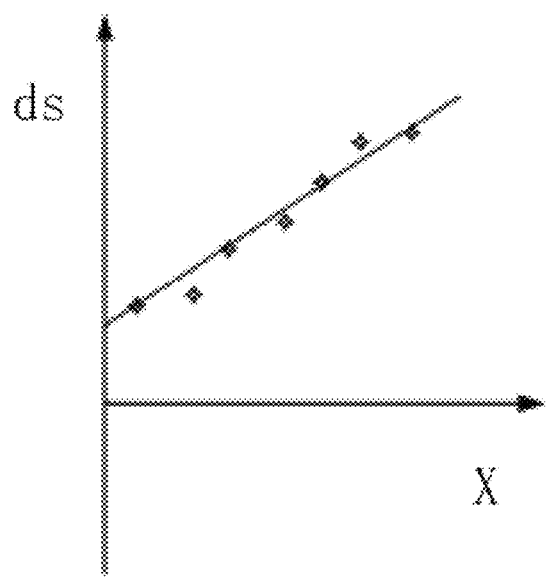
FIG. 3 is a schematic diagram of fitting between longitudinal movement distances and lateral distance values provided by a first embodiment of the present disclosure.

The zero point compensation angle for the EPS is generally in a state of small angle. The linear relationship between the longitudinal movement distance value and the smoothed lateral distance value may be obtained by performing the fitting through the Least Squares method or point-slope form. Referring to FIG. 3, after performing linear fitting, the resulting first parameter is K, and the resulting second parameter is D. The relationship between the longitudinal movement distance value and the smoothed lateral distance value may be expressed by the following formula:

$$d_s=K*X+D$$

$$X=v*t=v*i*0.05,$$

where $d_s$ refers to the smoothed lateral distance value, i refers to the control cycle, and v refers to the speed at which the vehicle travels.

In step 105, a zero point compensation angle is calculated for the EPS based on a first parameter in the linear relationship and a preset steering wheel transmission ratio.

Specifically, since the linear relationship between the longitudinal movement distance value and the smoothed lateral distance value has been calculated above, the zero point compensation angle for the EPS may be obtained by multiplying arctangent of the first parameter of the calculated linear relationship by the steering wheel transmission ratio.

$$\theta=\tan^{-1}(K)*k,$$

where θ refers to the zero point compensation angle for the EPS, K refers to the first parameter, and k refers to the steering wheel transmission ratio.

Furthermore, for the zero point compensation angle calculated for the EPS, it is necessary to verify whether the zero point compensation angle meets the requirement of rationality, and the specific method is as follows:

In step 106, a steering control angle is compensated based on the zero point compensation angle calculated for the EPS to obtain a compensated steering control angle.

Specifically, feedforward compensation is performed on the steering control angle using the zero point compensation angle calculated for the EPS to obtain a compensated steering control angle. Then, the vehicle performs steering control using the compensated steering control angle to obtain the actual driving path which is subjected to the steering control performed with the compensated steering control angle.

In step 107, a minimum residual error is calculated based on path points on a preset automatic driving verification path and path points on an actual driving path as obtained under the steering control using the compensated steering control angle when the vehicle is traveling.

Specifically, there may be a plurality of path points on the actual driving path. For all the path points, firstly from the x-coordinate of each path point on the actual driving path, that of the corresponding path point on the preset automatic driving verification path is subtracted and then the resulting x-coordinate difference is squared, and firstly from the y-coordinate of each path point on the actual driving path, that of the corresponding path point on the preset automatic driving verification path is subtracted and then the resulting y-coordinate difference is squared, and thereafter the resulting squares of the x-coordinate difference and the y-coordinate difference are added up for each path point. Afterwards, all the values obtained by the respective additions are summed up to obtain the minimum residual error. The preset automatic driving verification path is a planned path planned by the vehicle after performing zero point compensation for the EPS. Each path point on the actual driving path corresponds to each path point on the preset automatic driving verification path one by one through the control cycles.

The specific formula is as follows:

$$\varepsilon_N = \sum_{0}^{M} \left((p(i) - x(i))^2 + (n(i) - y(i))^2\right)$$

where p(i) refers to an x-coordinate of a path point corresponding to the $i^{th}$ control cycle on the actual driving path; n(i) refers to a y-coordinate of a path point corresponding to the P control cycle on the actual driving path; x(i) refers to an x-coordinate of the path point corresponding to the $i^{th}$ control cycle on the preset automatic driving verification path; y(i) refers to a y-coordinate of the path point corresponding to the $i^{th}$ control cycle on the preset automatic driving verification path; $\varepsilon_N$ refers to the minimum residual value; i refers to the index of a control cycle; and M refers to the total number of control cycles required for completing the preset automatic driving verification path.

In step 108, it is determined that the zero point compensation angle calculated for the EPS passes verification when the minimum residual error is less than a preset acceptable deviation.

In step 109, a flag bit identifying that the zero point compensation angle calculated for the EPS passes the verification is generated.

In step 110, the zero point compensation angle calculated for the EPS is written into a calibration file.

Specifically, the acceptable deviation may be set as $\varepsilon$. When $\varepsilon_N \leq \varepsilon$, it is determined that the zero point compensation angle calculated for the EPS has passed the verification and a flag bit is generated. When $\varepsilon_N \geq \varepsilon$, it means that the zero point compensation angle calculated for the EPS fails to pass the verification, and another flag bit different from the aforesaid flag bit is generated, while the vehicle returns to a starting point of the path planning and recalibrates the zero point compensation angle for the EPS.

Subsequently, the zero point compensation angle calculated for the EPS, which passes the verification, may be written into the calibration file, so that the zero point compensation angle calculated for the EPS may be called to compensate the steering control angle at any time during the automatic driving of the vehicle.

Herein, the flag bit indicating the pass of the verification may be "true" or "1", and the flag bit indicating the failure of the verification may be "false" or "0". For those that fail to pass the verification, step 101 to step 108 may be performed again until the verification is passed.

By applying the zero point compensation method for the EPS provided in the first embodiment of the present disclosure, the zero point compensation angle for the EPS can be calibrated for different vehicles, which can reduce the investment in personnel and time. In addition, the steering control angle of the vehicle can be compensated with the zero point compensation angle, which can improve the effectiveness of the control algorithm. Moreover, this feedforward method is superior to the feedback method in terms of time.

Figure 4:
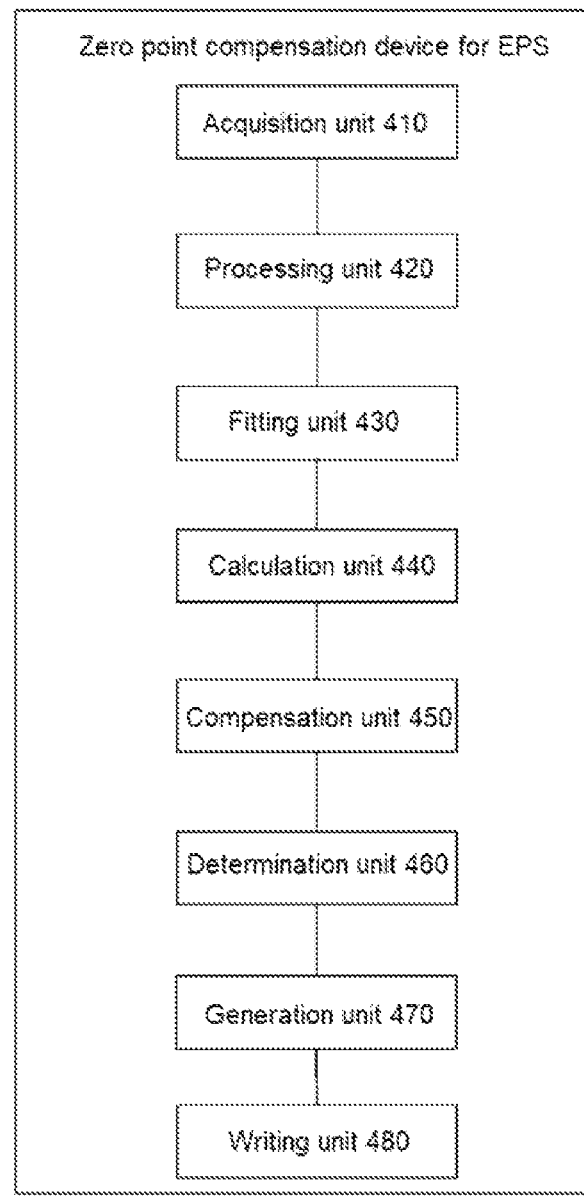
FIG. 4 is a schematic diagram of a structure of a zero point compensation device for the EPS provided by a second embodiment of the present disclosure.

FIG. 4 is a schematic diagram of a structure of a zero point compensation device for the EPS provided by a second embodiment of the present disclosure. The structural diagram of the zero point compensation device for the EPS is applied to the zero point compensation method for the EPS of the first embodiment. As shown in FIG. 4, the zero point compensation device 400 for the EPS includes: an acquisition unit 410, a processing unit 420, a fitting unit 430, a calculation unit 440, a compensation unit 450, a determination unit 460, a generation unit 470, and a writing unit 480.

The acquisition unit 410 is configured to acquire a value of lateral distance between a midpoint of a vehicle and an ideal path for each control cycle when the vehicle travels along the ideal path.

The processing unit 420 is configured to smooth the values of lateral distance for a plurality of control cycles to obtain a smoothed lateral distance value for each of the plurality of control cycles.

The calculation unit 440 is configured to calculate a longitudinal movement distance value of the vehicle for each control cycle, based on a constant speed at which the vehicle travels and the number of elapsed control cycles.

The fitting unit 430 is configured to perform linear fitting based on the smoothed lateral distance value and the longitudinal movement distance value for each control cycle to obtain a linear relationship between the longitudinal movement distance value and the smoothed lateral distance value.

The calculation unit 440 is further configured to calculate a zero point compensation angle for the EPS based on a first parameter of the linear relationship and a preset steering wheel transmission ratio.

The compensation unit 450 is configured to compensate a steering control angle based on the zero point compensation angle calculated for the EPS to obtain a compensated steering control angle.

The calculation unit 440 is further configured to calculate a minimum residual error, based on path points on a preset automatic driving verification path and path points on an actual driving path as obtained under the steering control using the compensated steering control angle when the vehicle is traveling.

The determination unit 460 is configured to determine that the zero point compensation angle calculated for the EPS passes verification when the minimum residual error is less than a preset acceptable deviation.

The generation unit 470 is configured to generate a flag bit identifying that the zero point compensation angle calculated for the EPS passes the verification.

The writing unit 480 is configured to write the zero point compensation angle calculated for the EPS into a calibration file.

Furthermore, the acquisition unit 410 is further configured to: determine a first path point and a second path point according to the midpoint of the vehicle and the ideal path, where the first path point and the second path point are path points on the ideal path that are closest to the midpoint; and obtain a lateral deviation value by dividing a product of a first direction vector and a second direction vector by a distance between the first path point and the second path point, where the first direction vector is a direction vector between the midpoint and the first path point, and the second direction vector is a direction vector between the midpoint and the second path point.

Furthermore, the processing unit 410 is further configured to perform a moving-average smoothing process on the values of lateral distance according to a preset smoothing window to obtain the smoothed lateral distance value for each control cycle.

Furthermore, the calculation unit 440 is further configured to multiply the constant speed, at which the vehicle travels, by a sampling interval and the number of elapsed control cycles to obtain the longitudinal movement distance value of the vehicle for each control cycle.

Furthermore, the fitting unit 430 is further configured to perform the linear fitting through a least squares method or a point-slope form by taking the longitudinal movement distance value for each control cycle as x-coordinates and taking the smoothed lateral distance value for each control cycle as y-coordinates to obtain the linear relationship between the longitudinal movement distance value and the smoothed lateral distance value, where the linear relationship is represented by a first parameter and a second parameter.

Furthermore, the calculation unit 440 is further configured to multiply arctangent of the first parameter by the steering wheel transmission ratio to obtain the zero point compensation angle for the EPS.

Furthermore, the calculation unit 440 is further configured to calculate for each path point on the actual driving path a first square plus a second square and then sum up to obtain the minimum residual error, where the first square is obtained by squaring an x-coordinate difference between a path point on the actual driving path and a corresponding path point on the preset automatic driving verification path and the second square is obtained by squaring a y-coordinate difference between the path point on the actual driving path and the corresponding path point on the preset automatic driving verification path.

By applying the zero point compensation device for the EPS provided in the second embodiment of the present disclosure, the zero point compensation angle for the EPS can be calibrated for different vehicles, which can reduce the investment in personnel and time. In addition, the steering control angle of the vehicle can be compensated with the zero point compensation angle, which can improve the effectiveness of the control algorithm. Moreover, this feed-forward method can compensate the steering control angle in advance and thus is superior to the feedback method in terms of time.

The third embodiment of the present disclosure provides an apparatus, which includes a memory and a processor. The memory is configured to have programs stored therein, and may be connected to the processor via a bus. The memory may be a non-volatile memory, such as a hard disk drive and a flash memory, and has software programs and device drivers stored therein. The software program can embody various functions of the method provided by the embodiments of the present disclosure, and the device driver may be a network and interface driver. The processor is configured to execute a software program, and when the software program is executed, the method provided in the first embodiment of the present disclosure can be implemented.

The fourth embodiment of the present disclosure provides a computer program product including instructions which, when run on a computer, cause the computer to implement the method provided in the first embodiment of the present disclosure.

The fifth embodiment of the present disclosure provides a computer-readable storage medium having computer programs stored therein, where the computer programs are executed by a processor to implement the method provided in the first embodiment of the present disclosure.

Those skilled in the art shall be further aware that the units and algorithm steps of examples described in the embodiments of the present disclosure can be implemented by an electronic hardware, computer software, or a combination thereof. In order to clearly illustrate the interchangeability of hardware and software, the composition and steps of each example have been generally illustrated in the description in accordance with the functions. Whether the functions are embodied by hardware or software depends on the specific application and design constraints of the technical solution. Those skilled in the art may implement the aforesaid functions in varying ways for each particular application, and such implementation should not be interpreted as causing a departure from the scope of the present disclosure.

The steps of the method or algorithm described in combination with the embodiments of the present disclosure can be implemented by hardware, or a software module executed by a processor, or a combination thereof. The software module may be placed in a random access memory (RAM), an internal memory, a read-only memory (ROM), an electrically programmable ROM, an electrically erasable programmable ROM, a register, a hard disk, a removable disk, or any other form of storage medium known in the art.

The aforesaid specific implementations further describe the object, technical solutions and beneficial effects of the present disclosure in detail. It should be understood that the implementations are only specific implementations of the present disclosure and are not used to limit the protection scope of the present disclosure. Any modification, equivalent replacement, improvement, or the like made within the spirit and principle of the present disclosure shall be included in the protection scope of the present disclosure

What is claimed is:

1. A zero point compensation method for electric power steering (EPS), comprising: acquiring, when a vehicle travels along an ideal path, a value of lateral distance between a midpoint of the vehicle and the ideal path for each control cycle of a plurality of control cycles; smoothing the values of lateral distance for the plurality of control cycles to obtain a smoothed lateral distance value for each of the plurality of control cycles; calculating a longitudinal movement distance value of the vehicle for each control cycle of the plurality of control cycles, based on a constant speed at which the vehicle travels and a number of elapsed control cycles of the plurality of control cycles; performing linear fitting based on the smoothed lateral distance value and the longitudinal movement distance value for each control cycle of the plurality of control cycles to obtain a linear relationship between the longitudinal movement distance value and the smoothed lateral distance value; calculating a zero point compensation angle for the EPS based on a first parameter in the linear relationship and a preset steering wheel transmission ratio;

compensating a steering control angle based on the zero point compensation angle calculated for the EPS to obtain a compensated steering control angle; calculating a minimum residual error, based on path points on a preset automatic driving verification path and path points on an actual driving path as obtained under the steering control using the compensated steering control angle when the vehicle is traveling; and determining that the zero point compensation angle calculated for the EPS passes verification when the minimum residual error is less than a preset acceptable deviation.

2. The zero point compensation method of claim 1, wherein the acquiring, when a vehicle travels along an ideal path, a value of lateral distance between a midpoint of the vehicle and the ideal path for each control cycle of the plurality of control cycles further comprises: determining a first path point and a second path point according to the midpoint of the vehicle and the ideal path, wherein the first path point and the second path point are path points on the ideal path that are closest to the midpoint; and obtaining a lateral deviation value by dividing a product of a first direction vector and a second direction vector by a distance between the first path point and the second path point, wherein the first direction vector is a direction vector between the midpoint and the first path point, and the second direction vector is a direction vector between the midpoint and the second path point.

3. The zero point compensation method of claim 1, wherein the smoothing the values of lateral distance for the plurality of control cycles to obtain the smoothed lateral distance value for each of the plurality of control cycles further comprises: performing a moving-average smoothing process on the values of lateral distance according to a preset smoothing window to obtain the smoothed lateral distance value for each control cycle of the plurality of control cycles.

4. The zero point compensation method of claim 1, wherein the calculating the longitudinal movement distance value of the vehicle for each control cycle of the plurality of control cycles, based on the constant speed at which the vehicle travels and the number of elapsed control cycles of the plurality of control cycles further comprises: multiplying the constant speed, at which the vehicle travels, by a sampling interval and the number of elapsed control cycles of the plurality of control cycles to obtain the longitudinal movement distance value of the vehicle for each control cycle of the plurality of control cycles.

5. The zero point compensation method of claim 1, wherein the performing the linear fitting based on the smoothed lateral distance value and the longitudinal movement distance value for each control cycle of the plurality of control cycles to obtain the linear relationship between the longitudinal movement distance value and the smoothed lateral distance value further comprises:
performing the linear fitting through a least squares method or a point-slope form by taking the longitudinal movement distance value for each control cycle of the plurality of control cycles as x-coordinates and taking the smoothed lateral distance value for each control cycle of the plurality of control cycles as y-coordinates to obtain the linear relationship between the longitudinal movement distance value and the smoothed lateral distance value, wherein the linear relationship is represented by the first parameter and a second parameter.

6. The zero point compensation method of claim 1, wherein the calculating the zero point compensation angle for the EPS based on the first parameter in the linear relationship and the preset steering wheel transmission ratio further comprises:
multiplying arctangent of the first parameter by the steering wheel transmission ratio to obtain the zero point compensation angle for the EPS.

7. The zero point compensation method of claim 2, wherein the calculating the minimum residual error, based on path points on the preset automatic driving verification path and path points on the actual driving path as obtained under the steering control using the compensated steering control angle when the vehicle is traveling further comprises:
calculating the minimum residual error according to $$\varepsilon_N = \sum_0^M ((p(i) - x(i))^2 + (n(i) - y(i))^2),$$

wherein p(i) refers to an x-coordinate of a path point corresponding to the $i^{th}$ control cycle on the actual driving path; n(i) refers to a y-coordinate of a path point corresponding to the $i^{th}$ control cycle on the actual driving path; x(i) refers to an x-coordinate of the path point corresponding to the $i^{th}$ control cycle on the preset automatic driving verification path; y(i) refers to a y-coordinate of the path point corresponding to the $i^{th}$ control cycle on the preset automatic driving verification path; $\varepsilon_N$ refers to the minimum residual error; i refers to the index of a control cycle; and M refers to the total number of control cycles required for completing the preset automatic driving verification path.

8. The zero point compensation method of claim 1, further comprising:
generating a flag bit identifying that the zero point compensation angle calculated for the EPS passes the verification; and
writing the zero point compensation angle calculated for the EPS into a calibration file.

9. A zero point compensation device for EPS, comprising an acquisition unit, a processing unit, a calculation unit, a fitting unit, a compensation unit and a determination unit, wherein the acquisition unit is configured to acquire a value of lateral distance between a midpoint of a vehicle and an ideal path for each control cycle of a plurality of control cycles when the vehicle travels along the ideal path; the processing unit is configured to smooth the values of lateral distance for the plurality of control cycles to obtain a smoothed lateral distance value for each of the plurality of control cycles; the calculation unit is configured to calculate a longitudinal movement distance value of the vehicle for each control cycle of the plurality of control cycles, based on a constant speed at which the vehicle travels and a number of elapsed control cycles of the plurality of control cycles; the fitting unit is configured to perform linear fitting based on the smoothed lateral distance value and the longitudinal movement distance value for each control cycle of the plurality of control cycles to obtain a linear relationship between the longitudinal movement distance value and the smoothed lateral distance value; the calculation unit is further configured to calculate a zero point compensation angle for the EPS based on a first parameter in the linear relationship and a preset steering wheel transmission ratio; the compensation unit is configured to compensate a steering control angle based on the zero point compensation angle calculated for the EPS to obtain a compensated steering control angle; the calculation unit is further configured to calculate a minimum residual error, based on path points on a preset automatic driving verification path and path points on an actual driving path as obtained under the steering control using the compensated steering control angle when the vehicle is traveling; and the determination unit is configured to determine that the zero point compensation angle calculated for the EPS passes verification when the minimum residual error is less than a preset acceptable deviation.

10. The zero point compensation device of claim 9, further comprising a generation unit and a writing unit, wherein
the generation unit is configured to generate a flag bit identifying that the zero point compensation angle calculated for the EPS passes the verification; and
the writing unit is configured to write the zero point compensation angle calculated for the EPS into a calibration file.

11. A computer-readable storage medium having computer programs stored therein, wherein the computer programs are executed by a processor to implement the zero point compensation method of claim 1.

* * * * *